3,211,777
METHOD OF PREPARING β-MERCAPTO-
PROPIONITRILE
Norbert M. Bikales, Livingston, N.J., assignor to American Cyanamid Company, Stamford, Conn., a corporation of Maine
No Drawing. Filed Dec. 10, 1962, Ser. No. 243,616
3 Claims. (Cl. 260—465.1)

This invention relates to, and has for its object, the provision of an improved method of preparing the compound β-mercaptopropionitrile.

β-Mercaptopropionitrile is a known compound. This compound, as disclosed in U.S. Letters Patent 2,630,452, can be used as an intermediate in the synthesis of other compounds and as a modifier in the formation of synthetic rubber. Several methods for its preparation are known.

One method, described in the patent itself, involves conversion of thioacetic acid to the desired product in the following manner:

(1) Reaction of thioacetic acid with acrylonitrile to give 2-cyanoethyl thioacetate, as shown in Equation A:

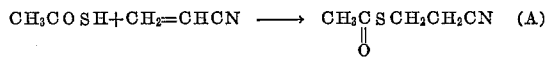

(2) Hydrolysis of the thioacetate with relatively concentrated solutions of a strong alkali, as shown in Equation B:

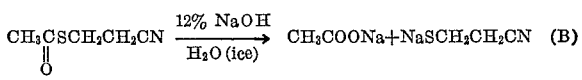

(3) Acidification, as shown in Equation C:

$$HX + NaSCH_2CH_2CN \longrightarrow HSCH_2CH_2CN + NaX \quad (C)$$

(4) Extraction with ether and distillation to give the desired product.

This method presents a significant difficulty in the alkaline hydrolysis of step 2. While it is desired to hydrolytically remove only the acetyl group, the cyano group is also prone to hydrolysis. To avoid this, carefully controlled temperatures are required, and even then, unwanted hydrolysis and loss of material results.

An alternative method, reported in J. Org. Chem., 26, 1443 (1961), involves the same shortcoming. Salts of thiourea are reacted with acrylonitrile to give the following intermediate

This intermediate is then subjected to steps 2, 3 and 4 as above noted. Here again, alkaline hydrolytic conditions, required for the performance of Step 2, tend to adversely affect the cyano group and give unwanted by-products.

By still another method, β-mercaptopropionitrile has been obtained from acrylonitrile and $H_2S$. This method, described in U.S. Letters Patent 2,748,155, requires the use of elaborate equipment since the reaction is conducted under elevated pressures and the yield is low, so that recycling is necessary. Moreover, the product is contaminated with much β,β'-thiodipropionitrile. While the latter can be transformed to β-mercaptopropionitrile, the conversion entails the additional steps of converting the mercaptide, extraction, acidification, a second extraction and distillation of the solvent.

The present invention provides an improved and simplified method for obtaining β-mercaptopropionitrile. It requires neither hydrolytic nor super-atmospheric pressure conditions. Similarly, it dispenses with the need for extraction procedures and consequent solvent losses.

In accordance with this method a 2-cyanoethyl alkylxanthate of the formula:

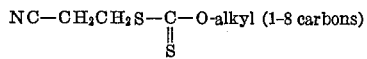

is pyrolyzed at a temperature between 120° and 250° C. Preferably, pyrolysis temperatures are kept above 150° C. and no higher than 220° C. since, in this range, by-products are kept to a minimum and reaction rate is relatively high. The pyrolysis product contains the desired β-mercaptopropionitrile. The product is obtained in high yield and in relatively pure form.

The compounds employed as starting materials in the present invention have not been reported in the literature. They are the subject of my copending application, Serial No. 241,144, filed November 30, 1962. There are presented several methods by which they can be obtained from known starting materials. The most preferred method therein disclosed for obtaining 2-cyanoethyl alkylxanthates involves the reaction of an alkali metal alkylxanthate in a solvent medium with a β-halopropionitrile. Approximately equal proportions of the reactants are used and the reaction proceeds at ambient temperatures to yield the desired xanthates. Thus, as shown in Example 1 of said copending application, 2-cyanoethyl isopropylxanthate is prepared as follows: To 79.0 g. of sodium isopropylxanthate in 250 ml. of water there was added 44.7 g. of β-chloropropionitrile. The mixture was stirred at room temperature overnight. The aqueous layer was separated from the insoluble oil and extracted with chloroform. The extract was mixed with the oil and then treated with activated carbon. Upon filtration and removal of volatiles at 80° C./1 mm. for 2 hours, there remained a light yellow oil, weighing 74.6 g.

The following examples are presented to further illustrate the present invention.

*Example 1*

2-cyanoethyl isopropylxanthate (15 parts) is heated in a distilling apparatus. At a pot temperature of approximately 120° C. and a pressure of 5 mm. distillation of a colorless liquid begins. Distillation becomes more rapid as the pot temperature is raised to 170°. The product has an index of refraction of $n_D^{26}$ 1.4866, and the characteristic infrared absorption for —SH and —CN groups. It has a strong unpleasant odor and becomes slightly yellow on storage. The yield is 4.9 parts (71%).

*Example 2*

The procedure of Example 1 was followed except for the substitution of 2-cyanoethyl sec-butylxanthate for the xanthate used therein. β-Mercaptopropionitrile was obtained in substantially the same yield.

Example 3

The procedure of Example 1 was followed except for the substitution of 2-cyanoethyl n-octylxanthate for the xanthate used therein. β-Mercaptopropionitrile was obtained in substantially the same yield.

Example 4

Following the procedure of Example 1 employing 2-cyanoethyl ethylxanthate as the starting material and increasing reaction temperature to a range of 200–220° C., the desired β-mercaptopropionitrile was obtained.

2-cyanoethyl pentylxanthate, like the corresponding ethylxanthate, required a pyrolysis within the range of 200–220° C.

I claim:
1. A process of preparing β-mercaptopropionitrile which comprises pyrolyzing 2-cyanoethyl alkylxanthate wherein the alkyl radical contains up to eight carbons, at a temperature between 120 and 220° C., and recovering the β-mercaptopropionitrile thus formed.
2. The process of claim 1 wherein the temperature of pyrolysis is above 150° C.
3. The process of claim 1 wherein the alkyl radical contains three carbon atoms.

References Cited by the Examiner

Reid, "Organic Chemistry of Bivalent Sulfur," 1962, pages 133–138, 140–150, Chemical Publishing Company, Inc., New York.

CHARLES B. PARKER, *Primary Examiner.*